(12) United States Patent
Ha

(10) Patent No.: US 11,359,327 B2
(45) Date of Patent: Jun. 14, 2022

(54) APPARATUS AND METHOD FOR DETECTING WATER SUPPLY LEVEL

(71) Applicant: LG ELECTRONICS INC., Seoul (KR)

(72) Inventor: Jeong Yo Ha, Gimpo-si (KR)

(73) Assignee: LG ELECTRONICS INC., Seoul (KR)

( * ) Notice: Subject to any disclaimer, the term of this patent is extended or adjusted under 35 U.S.C. 154(b) by 303 days.

(21) Appl. No.: 16/580,908

(22) Filed: Sep. 24, 2019

(65) Prior Publication Data
US 2021/0025104 A1    Jan. 28, 2021

(30) Foreign Application Priority Data

Jul. 22, 2019  (KR) .......... 10-2019-0088008

(51) Int. Cl.
| | |
|---|---|
| *D06F 39/08* | (2006.01) |
| *G06N 5/04* | (2006.01) |
| *G06N 20/00* | (2019.01) |
| *G01F 23/292* | (2006.01) |

(52) U.S. Cl.
CPC ........ *D06F 39/087* (2013.01); *G01F 23/2921* (2013.01); *G06N 5/04* (2013.01); *G06N 20/00* (2019.01)

(58) Field of Classification Search
CPC .... D06F 39/08; D06F 39/087; D06F 2103/00; D06F 2103/14; D06F 33/34; D06F 2103/18; D06F 2105/02; D06F 2105/58; D06F 34/22; G01F 23/2921; G06N 5/04; G06N 20/00; G06N 3/08; G06T 7/254; G06T 7/269; G06T 7/60; G06T 2207/10016; F21V 33/00; H04N 7/18
See application file for complete search history.

(56) References Cited

U.S. PATENT DOCUMENTS

| | | | |
|---|---|---|---|
| 7,292,313 B2* | 11/2007 | Poon ................. | G03F 7/708 355/53 |
| 9,191,568 B2* | 11/2015 | Peyman ............. | A61F 2/16 |

(Continued)

FOREIGN PATENT DOCUMENTS

| | | | | |
|---|---|---|---|---|
| AU | 2018204375 A1 * | 7/2018 | .......... | A61M 5/5086 |
| KR | 10-1997-0027432 A | 6/1997 | | |
| KR | 10-2019-0005414 A | 1/2019 | | |

*Primary Examiner* — Tung S Lau
(74) *Attorney, Agent, or Firm* — Birch, Stewart, Kolasch & Birch, LLP

(57) ABSTRACT

An apparatus, a system, and a method for detecting water supply based on a vision sensor by performing big data, an artificial intelligence (AI) algorithm, and/or a machine learning algorithm in a 5G environment connected for the Internet of things is provided. The apparatus for detecting water may be used for a washing machine and includes a vision sensor mounted on a tub or in the vicinity of the tub, directed toward at least one water supply region of interest in the tub, and configured to acquire an image of the water supply region of interest, and a water supply level determiner configured to detect a water supply level through a vision algorithm based on the image information acquired by the vision sensor. The determiner may predict water supply time to the point in time at which the water supply will be completed based on models trained by machine learning.

9 Claims, 12 Drawing Sheets

(56) References Cited

U.S. PATENT DOCUMENTS

| | | | | |
|---|---|---|---|---|
| 2007/0107801 A1* | 5/2007 | Cochran | ............... | G01F 13/006 |
| | | | | 141/153 |
| 2011/0310143 A1* | 12/2011 | Shmuel | ................ | B41J 2/17509 |
| | | | | 347/7 |
| 2014/0309782 A1* | 10/2014 | Sharpe | ............... | G01N 15/1404 |
| | | | | 700/266 |
| 2015/0042865 A1* | 2/2015 | Peyman | .................... | G02B 3/14 |
| | | | | 348/345 |

* cited by examiner

Fig. 3B

| Level | WATER SUPPLY AMOUNT | |
|---|---|---|
| 0 | WATER SUPPLY (ERROR) | X |
| 1 | WATER SUPPLY HALF (CAUTIOUS WATER SUPPLY) | 1 |
| 2 | WATER SUPPLY HALF (NORMAL WATER SUPPLY) | 2 |
| 3 | WATER SUPPLY (NORMAL WATER SUPPLY) | COMPLETE |

Fig. 5

| PERFORMANCE | ALGORITHM | API | LIBRARY | WATER SUPPLY DETECTING LEVEL |
|---|---|---|---|---|
| FIRST CLASS | Lucas-Kanade | cvCalcOpticalFlowLK() | OpenCV 2.x | THIRD STEP |
| THIRD CLASS | Iterative Lucas-Kanade method with pyramids. | calcOpticalFlowPyrLK() | OpenCV 2.x OpenCV 3.x | SECOND STEP |
| SECOND CLASS | Gunnar Farneback's algorithm | calcOpticalFlowFarneback() | OpenCV 3.x | SECOND STEP |
| FOURTH CLASS | Background Subtraction | | OpenCV 3.x | X |

Fig. 6A

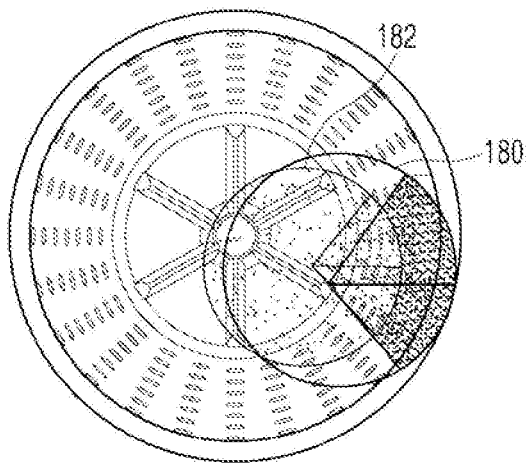

Fig. 6D

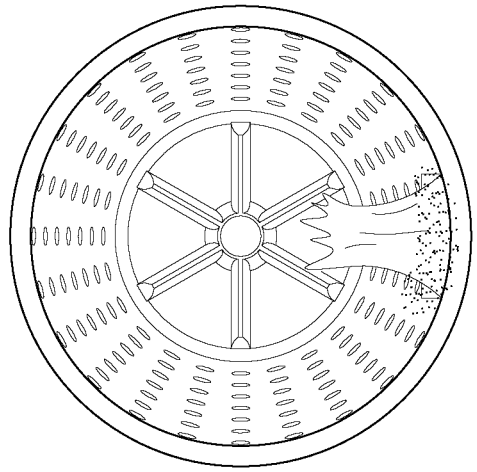

```
WATER SUPPLY DETECTION :: 258
WATER SUPPLY DETECTION :: 255
WATER SUPPLY DETECTION :: 277
WATER SUPPLY DETECTION :: 216
WATER SUPPLY DETECTION :: 328
WATER SUPPLY DETECTION :: 223
WATER SUPPLY DETECTION :: 208
WATER SUPPLY DETECTION :: 278
WATER SUPPLY DETECTION:: 238
WATER SUPPLY DETECTION :: 220
WATER SUPPLY DETECTION :: 228
WATER SUPPLY DETECTION :: 214
WATER SUPPLY DETECTION :: 262
```

Fig. 6E

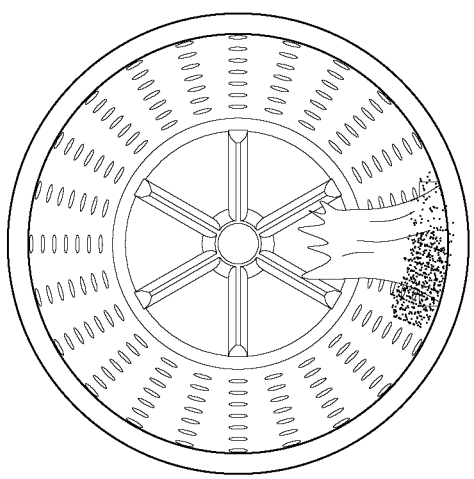

```
WATER SUPPLY DETECTION :: 258
WATER SUPPLY DETECTION :: 255
WATER SUPPLY DETECTION :: 277
WATER SUPPLY DETECTION :: 216
WATER SUPPLY DETECTION :: 328
WATER SUPPLY DETECTION :: 223
WATER SUPPLY DETECTION :: 208
WATER SUPPLY DETECTION :: 278
WATER SUPPLY DETECTION :: 238
WATER SUPPLY DETECTION :: 220
WATER SUPPLY DETECTION :: 228
WATER SUPPLY DETECTION :: 214
WATER SUPPLY DETECTION :: 262
```

Fig. 7A
| VARIABLE | AVERAGE | STANDARD DEVIATION | VARIANCE | SUM | MAXIMUM VALUE |
|---|---|---|---|---|---|
| Level 0 | 20.17 | 12.39 | 153.51 | 1815.00 | 60.00 |
| Level 1-1 | 130.79 | 30.60 | 936.60 | 11771.00 | 215.00 |
| Level 1-2 | 242.19 | 33.67 | 1133.84 | 21797.00 | 354.00 |
| Level 2 | 243.87 | 41.29 | 41.29 | 21948.00 | 359.00 |
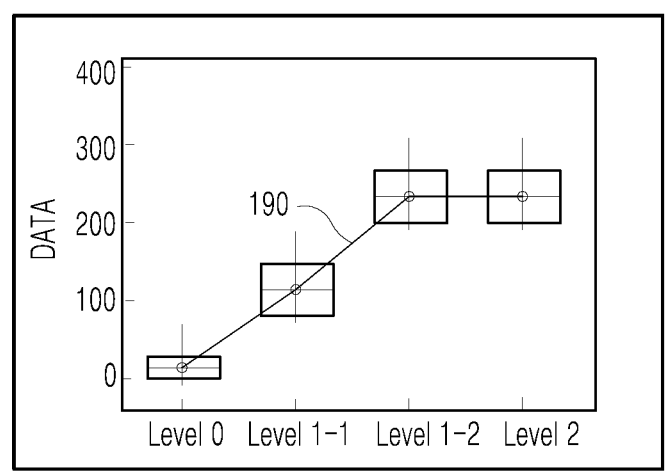
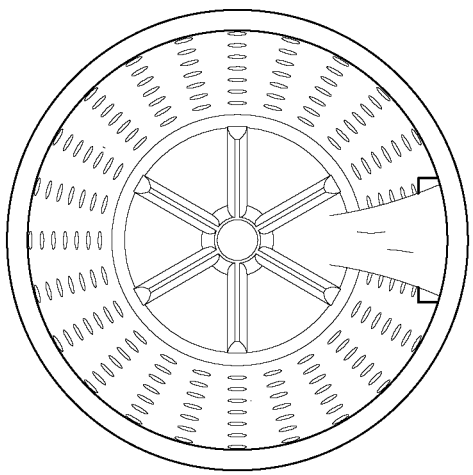

FIG. 7B
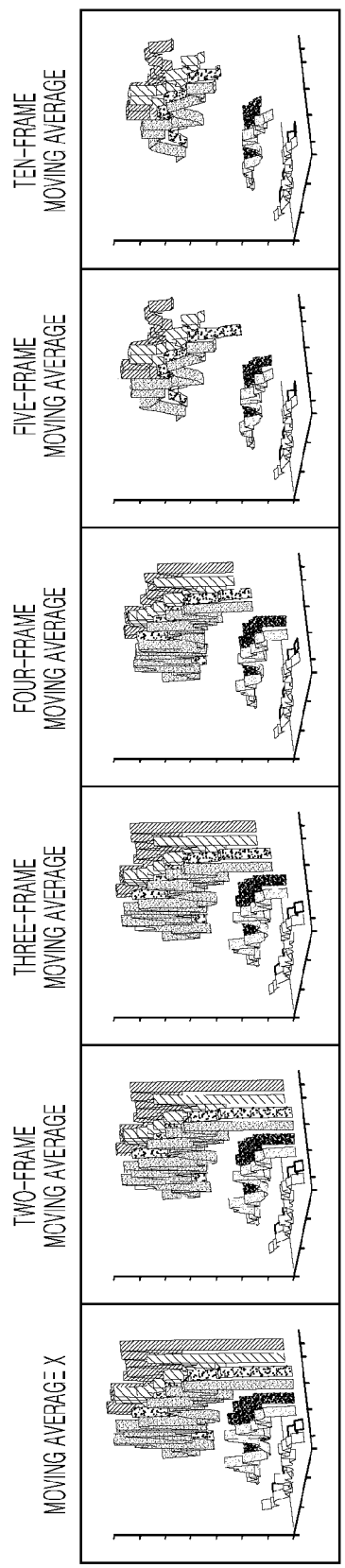
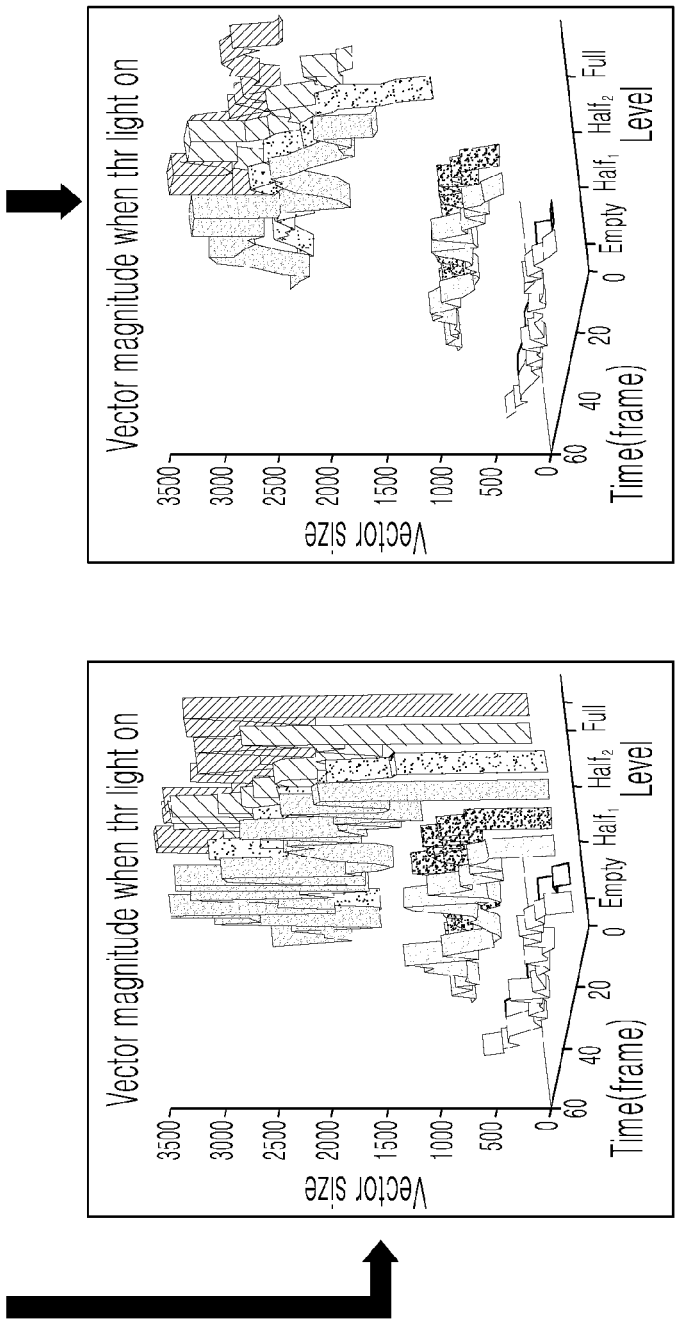

| 5-FRAME MOVING AVERAGE | AVERAGE | NO WATER SUPPLY | CAUTIOUS WATER SUPPLY | QUASI-NORMAL WATER SUPPLY | NORMAL WATER SUPPLY |
|---|---|---|---|---|---|
|  | min | 225   124 | 601   678 | 1727 1725 | 1777 2276 |
|  | max | 524   392 | 1174 1212 | 2853 2532 | 2643 3046 |
|  | mean | 349   229 | 886   940 | 2201 2118 | 2199 2638 |
|  | median | 314   212 | 874   897 | 2185 2093 | 2199 2627 |
|  | Range | 124~524 | 601~1212 | 1725~2853 | 1777~3046 |

APPARATUS AND METHOD FOR DETECTING WATER SUPPLY LEVEL

CROSS-REFERENCE TO RELATED APPLICATION

This present application claims benefit of priority to Korean Patent Application No. 10-2019-0088008, entitled "FLUID LEVEL DETECTION DEVICE AND METHOD," filed on Jul. 22, 2019, in the Korean Intellectual Property Office, the entire disclosure of which is incorporated herein by reference.

BACKGROUND

1. Technical Field

The present disclosure relates to an apparatus, a system, or a method for detecting a water supply level of a fluid being supplied to a container. More specifically, the present disclosure relates to an apparatus, a system, and a method that detect a water supply level to detect a blockage in a water supply path connected to a water supply container included in a water supply tank, a washing machine, or the like to supply a fluid. The present disclosure mainly discloses an apparatus, a system, and a method for detecting a water supply level to detect a blockage in a water supply path configured to supply washing water into a tub of a washing machine, but the present disclosure is not limited thereto. The present disclosure may be used for water supply equipment that needs to monitor the blockage in the water supply path.

2. Description of Related Art

In general, a washing machine includes a washing/spin-drying tub capable of washing, rinsing, and spin-drying laundry, water supply ports configured to supply hot water or cold water to the washing/spin-drying tub, a water level sensor configured to detect a level of washing water to be inputted to the washing/spin-drying tub, hot-water and cold-water valves configured to adjust the amount of water to be supplied to the washing/spin-drying tub through the water supply port, and water supply hoses configured to connect the water supply ports to the hot-water and cold-water valves. When the washing machine operates to supply the washing water to the washing tub, a water supply valve connected to the washing machine may be locked, the washing water may not be appropriately supplied because a water supply tube connected to the water supply valve is twisted, bent, or pressed, and a water supply defect may occur due to a water leakage at a hose connecting part. Therefore, there may occur an error in water supply due to a blockage and abnormality in the water supply tube. In the related art, a water level sensor, a microphone, or the like is used for the washing machine to check for whether the water is appropriately supplied to the washing tub.

In this regard, an example of an apparatus for detecting a water supply level of a fluid being supplied to a container in the related technical field includes a step of applying electric power to a laundry processing device and inputting an installation inspection instruction, a step of detecting an initial water level in an outer tub and storing a value of the detected initial water level, and a step of opening a cold-water valve and determining whether the water level in the outer tub reaches a target water level within a first predetermined time t1, in which a first error message for indicating a water supply error is displayed on a display when the water level in the outer tub cannot reach the target water level within the first predetermined time t1. However, because a water supply error detection time exceeds about 10 minutes to check the water level by using the water level sensor, it takes a long time to ascertain the water supply level required to wash the laundry in the washing tub even though a water supply error occurs, and as a result, a washing time is also increased.

Another example for detecting a water supply level of a fluid being supplied to a container in the related technical field relates to a water level measuring device for measuring a water level in a washing tub by using a microphone installed on a top cover of a washing machine, and particularly, to a water level measuring device for a washing machine, which is capable of detecting water in a washing tub by detecting intensity of sound, which is generated when the supplied water falls, by using a microphone installed on a top cover of the washing machine. The example discloses that a water level is measured by measuring sound, which is generated when a water is supplied to a washing tub, by using a microphone, such that no sensor is required, and thus there are no change in mechanical lifespan and no error for each set caused by the sensor, and as a result, sensing reliability is improved, and the microphone may be used for other applications. However, according to the method of detecting the intensity of sound generated, which is generated when the supplied water falls, by using the microphone, it is difficult to precisely determine the water supply level only based on the intensity of sound because a pressure of water supplied to each household using the washing machine varies, whereby the intensity of the sound of the falling water may vary.

SUMMARY OF THE INVENTION

An aspect of the present disclosure is to solve the problem that takes a long time when checking water supply detection time by using a water level sensor or the like in a washing machine or water supply equipment in the related art.

Another aspect of the present disclosure is to detect an erroneous water supply faster than in the related art when the erroneous water supply occurs when a water supply valve connected to a washing machine in a user's home is locked or when there is a blockage and abnormality in a water supply tube connected to a water supply valve.

Another aspect of the present disclosure is to detect an erroneous water supply faster than in the related art when the erroneous water supply occurs when a water supply valve connected to a washing machine in a user's home is locked or when there is a blockage and abnormality in a water supply tube connected to a water supply valve.

Still another aspect of the present disclosure is to find a method of classifying a water supply level in accordance with the water supply amount when water is supplied in a washing machine or water supply equipment.

Yet another aspect of the present disclosure is to predict the water supply time (expected water supply time) and the water supply amount to a point in time at which the water supply is completed based on the amount of water with the water supply level when the water is supplied in a washing machine or water supply equipment.

Still yet another aspect of the present disclosure is to reduce the overall washing time by reducing the erroneous water supply detection time in a washing machine.

Technical problems to be solved by the present disclosure are not limited to the above-mentioned technical problems, and other technical problems, which are not mentioned above, may be clearly understood from the following descriptions by those skilled in the art to which the present disclosure pertains.

To achieve the above-mentioned objects or other objects, a washing machine or an apparatus for detecting a water supply according to an exemplary embodiment of the present disclosure includes a vision sensor configured to acquire an image of an interior of a water supply container or a washing machine tub, and a water supply level determiner configured to detect a water supply level in accordance with the amount of fluid being supplied into the water supply container through a predetermined vision algorithm.

Specifically, the washing machine or the apparatus may include the water supply container capable of receiving therein a supplied fluid, the vision sensor mounted on the water supply container or in the vicinity of the water supply container and configured to acquire an image of the interior of the water supply container, and the water supply level determiner configured to determine the water supply level in accordance with the amount of fluid being supplied into the water supply container through the vision algorithm based on the image information acquired by the vision sensor.

A method of detecting a water supply level in a water supply container according to another exemplary embodiment of the present disclosure may include acquiring a water supply image by a vision sensor mounted in the vicinity of the washing machine tub, setting a water supply region of interest in respect to the image information, detecting a feature of the water supply region of interest through a predetermined vision algorithm, and determining a water supply level based on the detected feature of the water supply region of interest.

According to the exemplary embodiment of the present disclosure, the erroneous water supply detection time, which exceeds 10 minutes in a washing machine in the related art, can be reduced by detecting the erroneous water supply within 3 seconds (90 frames) to 5 seconds (150 frames). In addition, the washing machine or the apparatus for detecting a water supply level can detect the erroneous water supply and measure the water supply amount for each water supply level.

In addition, with the effect of detecting the initial erroneous water supply and reducing the detection time, the washing machine can reduce the overall washing process time and predict the more accurate washing completion time.

In addition, since the washing machine can predict the more accurate washing completion time, thereby reducing a washing process time, it is possible to provide users with energy savings and improved convenience.

BRIEF DESCRIPTION OF THE DRAWINGS

The above and other aspects, features, and advantages of the present disclosure will become apparent from the detailed description of the following aspects in conjunction with the accompanying drawings, in which:

FIG. 3B is an exemplified view illustrating water supply levels with respect to the water supply amounts according to the exemplary embodiment of the present disclosure;

FIG. 5 is an exemplified view illustrating tests of water supply level detecting performances with respect to the Lucas-Kanade algorithm, the pyramid Lucas-Kanade algorithm, the Gunnar-Farneback algorithm, and the background algorithm which are vision algorithms;

FIG. 6A is an exemplified view illustrating a water supply region of interest (ROI) set in respect to image data acquired by a vision sensor;

FIG. 6D is an exemplified view illustrating a state in which the water supply region of interest is set in accordance with FIG. 6A and an optical vector in a section in which a water supply starts in a normal water supply manner is indicated by using an optical flow;

FIG. 6E is an exemplified view illustrating a state in which the water supply region of interest is set in accordance with the FIG. 6A and an optical vector in a section in which a water supply is stably performed in a normal water supply manner is indicated by using an optical flow;

FIG. 7A is an exemplified view illustrating frame averages, standard deviations, variances, sums, and maximum values with respect to water supply levels;

FIG. 7B is an exemplified view illustrating a graph showing moving averages of optical vectors in respect to 0, 2, 3, 4, 5, and 10 frames.

DETAILED DESCRIPTION

Advantages and features of the present disclosure and methods of achieving the advantages and features will be more apparent with reference to the following detailed description of example embodiments in connection with the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The example embodiments disclosed below are provided so that the present disclosure will be thorough and complete, and also to provide a more complete understanding of the scope of the present disclosure to those of ordinary skill in the art. In the description of the present invention, the specific descriptions of publicly known related technologies will be omitted when it is determined that the specific descriptions may obscure the subject matter of the present invention.

The terminology used herein is used for the purpose of describing particular example embodiments only and is not intended to be limiting. Singular expressions include plural expressions unless clearly described as different meanings in the context. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, the terms such as "first," "second," and other numerical terms may be used herein only to describe various elements, but these elements should not be limited by these terms. These terms are used only to distinguish one constituent element from another constituent element.

In the description of the present disclosure, the terms of the respective constituent elements to be defined are defined in consideration of the functions of the present disclosure. Therefore, the terms should not be understood as meanings limiting the technical constituent elements of the present disclosure. In addition, the terms of the respective constituent elements may be referred to as other terms in the art.

Hereinafter, a washing machine 100 according to an exemplary embodiment of the present disclosure will be described in detail with reference to the accompanying drawings.

Figure 1:
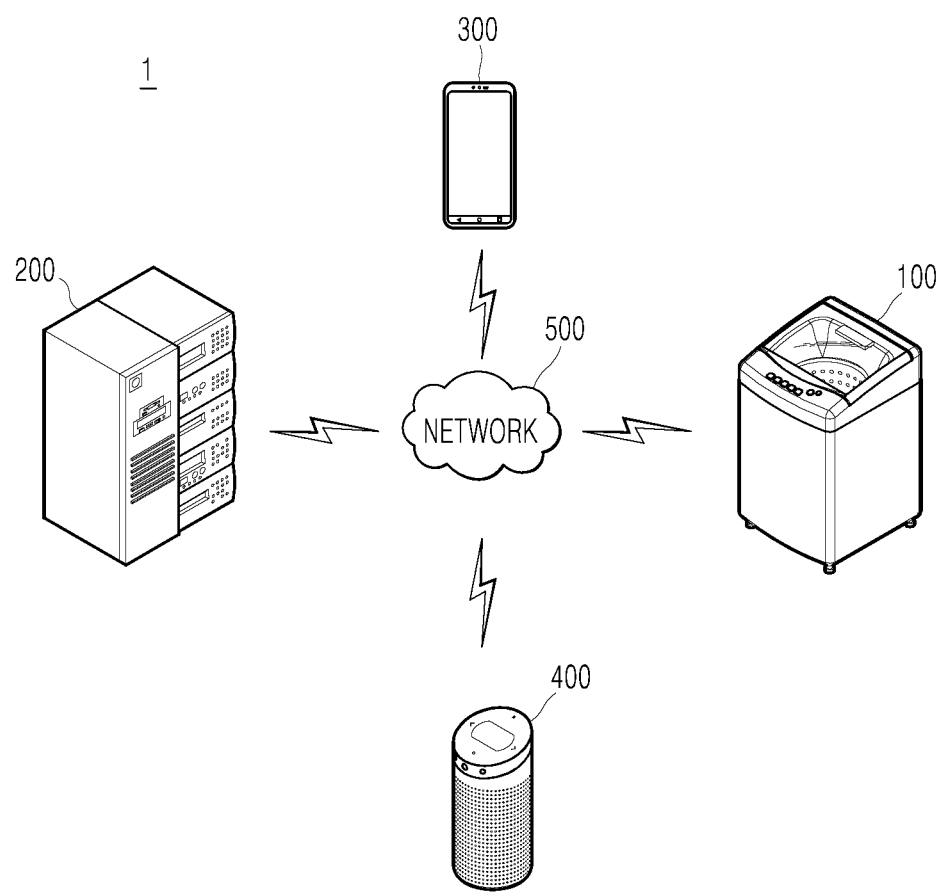
FIG. 1 is an exemplified view illustrating an operating environment of a washing machine according to an exemplary embodiment of the present disclosure, a user terminal, an output device, and a network that connects the washing machine, the user terminal, and the output device.

FIG. 1 is an exemplified view of an operating environment 1 including the washing machine 100 according to the exemplary embodiment of the present disclosure, an output device capable of transmitting instructions to the washing machine 100, a user terminal, a server, and a network that connects the washing machine 100, the output device, the user terminal, and the server. A device for detecting an error in water supply to a washing machine tub or a water supply container may reduce a water supply error detection time by using big data, artificial intelligence (AI) algorithms, and/or machine learning algorithms in a 5G environment connected for the Internet of things.

Referring to FIG. 1, the operating environment 1 of the washing machine may include the washing machine 100, a server 200, a user terminal 300, an output device 400, and a network 500. The output device 400 may include an artificial intelligence speaker, an artificial intelligence TV, and other communication devices. The washing machine 100 may include a communicator and may transmit image data, in respect to the water supply into the tub of the washing machine, which are captured by a vision sensor, to the server 200 through the wired or wireless network 500. The server 200 may transmit various types of washing information and information about the image data in respect to the water supply into the washing machine tub to the washing machine 100, the user terminal 300, and the output device 400 such as an artificial intelligence speaker.

The washing machine 100 may include a communicator, an input interface, a sensor including a vision sensor 140, an output interface including a display, a storage including a memory, a washing unit including physical devices for washing laundry such as a power supply and the washing tub, and a controller including a washing machine motor control unit (MCU). The washing machine MCU or the controller including the washing machine MCU may include a determiner configured to detect a water supply level/error based on image data acquired by the vision sensor 140.

The washing machine controller may include any type of device capable of processing data, such as a processor, for example, an MCU. Here, the 'processor' may refer to a data processing device embedded in hardware and having, for example, a circuit physically structured to perform a function represented by codes or instructions included in a program. Examples of the data processing device embedded in hardware may include processing devices such as a microprocessor, a central processing unit (CPU), a processor core, a multi-processor, an application-specific integrated circuit (ASIC), or a field programmable gate array (FPGA), but the scope of the present disclosure is not limited thereto.

In the present exemplary embodiment, the washing machine 100 and the server 200 may search for the output device 400, adjust volume of audio signals outputted from the output device 400, and perform machine learning such as deep learning on the selection in respect to the output device 400. The storage may store data used for the machine learning, result data, and the like.

Meanwhile, the washing machine 100 and the server 200 may be equipped with artificial neural networks and search for the one or more output devices 400 which are disposed in the same space as the washing machine 100 and output at least one of the audio signal and the video signal. The washing machine 100 and the server 200 may search for the output device 400 and adjust output signals based on the machine learning to adjust the output signals of the one or more output devices 400 searched corresponding to an operating mode. In addition, the washing machine 100 may select at least one of the one or more output devices 400 searched corresponding to the operating mode, and the washing machine 100 may select the output device 400 and transmit, to the selected output device 400, the output signals based on the machine learning to transmit at least one of the audio signal and the video signal.

The washing machine communicator may provide a communication interface required to provide transmission/reception signals, in the form of packet data, between the output device 400, the user terminal 300, and/or the server 200 while operating in conjunction with the network 500. In addition, the communicator may support various types of communication of intelligence of things (Internet of things (IoT), Internet of everything (IoE), Internet of small things (IoST), etc.), and may support machine to machine (M2M) communication, vehicle to everything (V2X) communication, device to device (D2D) communication, and the like.

In the present exemplary embodiment, the user terminal 300 may be, but not limited to, a desktop computer, a smartphone, a notebook computer, a tablet PC, a smart TV, a mobile phone, a personal digital assistant (PDA), a laptop, a media player, a micro server, a global positioning system (GPS) device, an electronic book reader, a digital broadcasting terminal, a navigation system, a kiosk, an MP3 player, a digital camera, a home appliance, and other mobile or non-mobile computing devices which are operated by a user. In addition, the user terminal 300 may be a wearable terminal such as a watch, glasses, a hair band, and a ring having a communication function and a data processing function. The user terminal 300 is not limited to the above-mentioned configuration, and a terminal capable of web browsing may be adopted without limitation. In an optional exemplary embodiment, the user terminal 300 may be operated by any one of the output devices 400 described above.

The server 200 may be a data base server configured to provide big data required to apply various types of artificial intelligence algorithms and provide data required to operate the washing machine 100. In addition, the server 200 may include a web server or an application server capable of remotely controlling the operation of the washing machine 100 by using a washing machine driving application installed in the user terminal 300 or a washing machine driving web browser.

Artificial intelligence (AI) is an area of computer engineering and information technology that studies how to make computers perform things that humans are capable of doing with human intelligence, such as reasoning, learning, self-improving, and the like.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed. More specifically, machine learning is a technology that investigates and builds systems, and algorithms for such systems, which are capable of learning, making predictions, and enhancing their own performance on the basis of experiential data. Machine learning algorithms, rather than executing rigidly-set static program commands, may take an approach that builds a specific model based on input data for deriving a prediction or decision.

The server 200 may receive, from the washing machine 100, the result of searching for the operating one or more output devices 400 and the operating mode of the washing machine 100, and may transmit, to the washing machine 100, an output signal adjusting control signal of the one or more output devices 400 selected corresponding to the operating mode. In addition, the server 200 may receive the operating mode of the washing machine 100 from the washing machine 100, transmit, to the washing machine 100, the result of selecting at least one of the one or more output devices 400, and control and transmit at least one of the audio signal and the video signal to the output device 400 selected by the washing machine 100.

The network 500 may serve to connect the washing machine 100, the output device 400, the user terminal 300, and the server 200. The network 500 may be, for example, wired networks such as local area networks (LANs), wide area networks (WANs), metropolitan area networks (MANs), and integrated service digital networks (ISDNs) or wireless networks such as wireless LANs, CDMA, Bluetooth, and satellite communication, but the scope of the present disclosure is not limited thereto. In addition, the network 500 may transmit and receive information using near-field communication and/or long-range communication. Here, the near-field communication may include Bluetooth, radio frequency identification (RFID), infrared data association (IrDA), ultra-wideband (UWB), ZigBee, and Wi-Fi (wireless fidelity) technologies, and the long-range communication may include code division multiple access (CDMA), frequency division multiple access (FDMA), time division multiple access (TDMA), orthogonal frequency division multiple access (OFDMA), and single carrier frequency division multiple access (SC-FDMA) technologies.

The network 500 may include connection between network elements such as hubs, bridges, routers, switches, and gateways. The network 500 may include one or more connected networks, for example, multiple network environments including public networks such as the Internet and private networks such as secure corporate private networks. The access to the network 500 may be provided through one or more wired or wireless access networks. Furthermore, the network 500 may support the Internet of Things (IoT) network and/or the 5G communication for exchanging and processing information between distributed components such as things.

Figure 2A:
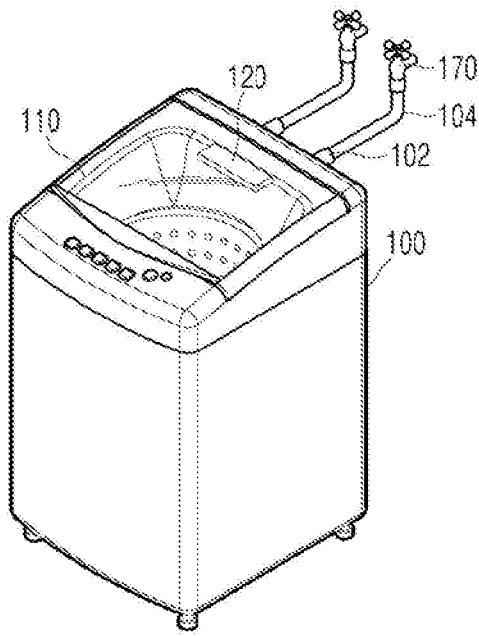
FIG. 2A is an exemplified view illustrating the washing machine according to the exemplary embodiment of the present disclosure.

FIG. 2A is an exemplified view illustrating the washing machine according to the exemplary embodiment of the present disclosure. The washing machine according to the exemplary embodiment of the present disclosure may include a tub (washing/spin-drying tub) 130 capable of washing, rinsing, and spin-drying laundry, water supply ports 102 configured to supply hot water and cold water to the tub 130, hot-water and cold-water valves 170 configured to adjust the amount of water to be supplied to the tub 130 through the water supply port 102, water supply hoses 104 configured to connect the water supply ports 102 to the hot water and cold-water valves 170, and a vision assembly 120 configured to capture an image of washing water being supplied into the tub 130. A water supply level/error detecting device according to the present disclosure may be applied to all washing machines/spin-driers including drum washing machines/spin-driers and top loader washing machines/spin-driers to which washing water is supplied to wash and spin-dry laundry. In addition, the water supply level/error detecting device according to the present disclosure may be applied to water supply equipment that needs to monitor whether water is appropriately supplied to a water supply tank and a water supply tub.

Figure 2B:
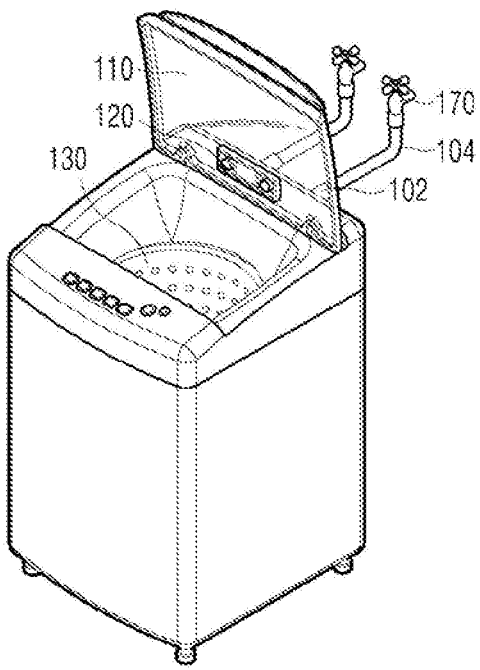
FIG. 2B is an exemplified view illustrating a cover part of the washing machine according to the exemplary embodiment of the present disclosure.

FIG. 2B is an exemplified view illustrating a cover of a top loader washing machine including a water supply level detecting device according to the exemplary embodiment of the present disclosure. In the top loader washing machine according to the exemplary embodiment of the present disclosure, the vision assembly 120 may be mounted on a washing machine cover 110 at an upper end of the tub 130. The vision assembly 120 may be mounted at a position at which the vision assembly 120 appropriately captures an image of washing water being supplied into the tub of the washing machine or a water supply device. In the case of a drum washing machine, the vision assembly may be mounted on a front door to capture an image of washing water being supplied to the tub.

Figure 2C:
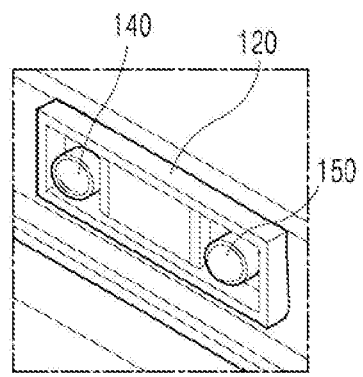
FIG. 2C is an exemplified view illustrating a vision assembly of the washing machine according to the exemplary embodiment of the present disclosure.

FIG. 2C is an exemplified view illustrating the vision assembly of the washing machine according to the exemplary embodiment of the present disclosure. The vision assembly 120 is mounted in the vicinity of the water supply container or on the water supply container. In the case of the washing machine, the vision assembly 120 may be mounted in the vicinity of the washing machine tub to capture an image of an interior of the rotating tub. The washing machine may include a lighting device 150 configured to illuminate the vision sensor 140 and the portion toward which the vision sensor 140 is directed. The vision sensor 140 may be separately mounted in the vicinity of the water supply container or on the water supply container or may be mounted in the vicinity of the washing machine tub. The vision sensor 140 may be a 2D camera or any image capturing device capable of capturing an image. The lighting device 150 may be an LED or any lighting device capable of illuminating an interior of the washing machine.

Figure 2D:
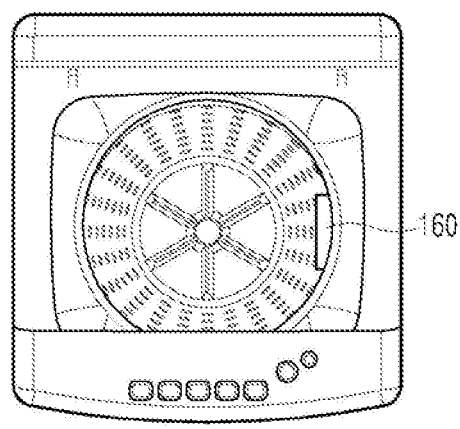
FIG. 2D is an exemplified view illustrating a state in which washing water is supplied to a tub of the washing machine according to the exemplary embodiment of the present disclosure.

FIG. 2D is an exemplified view illustrating a state in which washing water is supplied to the tub of the washing machine according to the exemplary embodiment of the present disclosure. In the case of the top loader washing machine, a water supplier 160 is provided at the upper end of the tub 130. In another exemplary embodiment, the top loader washing machine may have water suppliers 160 provided in several directions at the upper end of the tub 130. In the case of the drum washing machine, the water supplier may be provided at an upper end or a lateral side of a cylindrical shape of the tub when the cylindrical shape of the tub is laid down toward the front side.

Figure 3A:
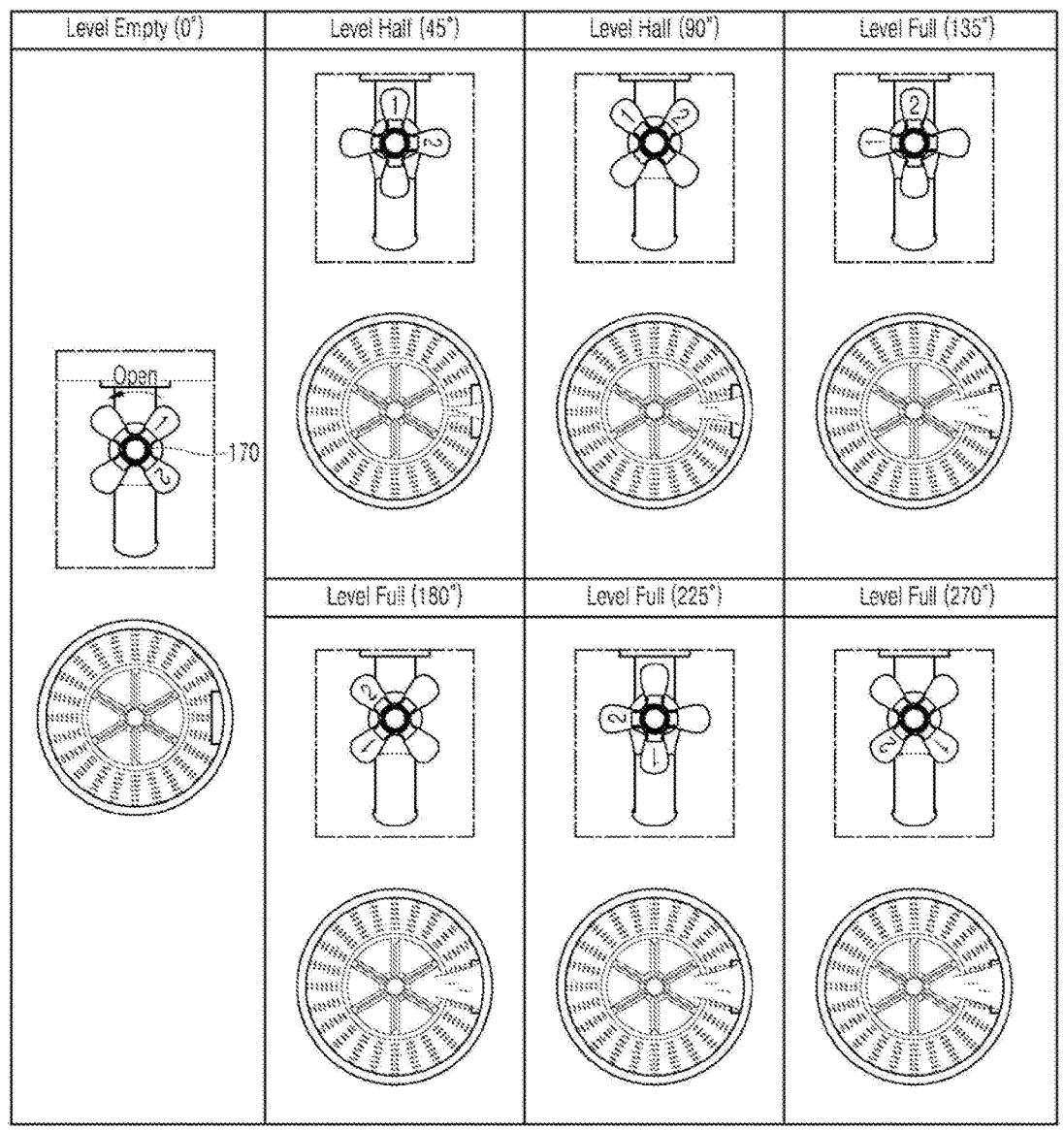
FIG. 3A is an exemplified view illustrating degrees of water supply amounts of the washing water with respect to angles of a water supply valve configured to supply the washing water to the washing machine according to the exemplary embodiment of the present disclosure.

FIG. 3A is an exemplified view illustrating degrees of water supply amounts of the washing water with respect to angles of a water supply valve configured to supply the washing water to the washing machine according to the exemplary embodiment of the present disclosure. When the water supply valve 170 for hot water and cold water is opened, the water supply valve 170 supplies washing water to the washing machine water supply port 102 through the water supply hose 104. The amount of water supplied by the water supply valve 170 depends on an opening angle of the water supply valve 170. The water supply valve 170 according to the exemplary embodiment of the present disclosure is a water supply valve configured to be opened by being rotated by 270 degrees.

FIG. 3A illustrates the amounts of washing water to be supplied to the washing machine tub when the water supply valve 170 is opened at angles of 45 degrees, 90 degrees, 135 degrees, 180 degrees, 225 degrees, and 270 degrees. In the exemplary embodiment, the rotation angle of the water supply valve 170 may be classified into Water Supply Half 1 (45 degrees), Water Supply Half 2 (90 degrees), Water Supply Half 3 (135 degrees), and Water Supply Full (180 degrees, 225 degrees, and 270 degrees). Water Supply Half 1 (45 degrees) refers to a degree to which the water supply amount is small, that is, a degree to which the washing water trickles, and Water Supply Half 3 (135 degrees) and Water Supply Full (180 degrees, 225 degrees, and 270 degrees) refer to degrees to which the water supply is smoothly performed, that is, degrees to which the washing water gushes. Water Supply Half 2 (90 degrees) refers to an intermediate degree of water stream between Water Supply Half 1 (45 degrees) and Water Supply Half 3 (135 degrees).

FIG. 3B is an exemplified view illustrating water supply levels with respect to the water supply amounts according to the exemplary embodiment of the present disclosure. FIG. 3B illustrates the table showing Water Supply Levels 0 to 3 with respect to the water supply amounts. Level 0 indicates a state in which no water supply is performed and may refer to an erroneous water supply, Level 1 indicates a state in which the water supply is performed weakly and may refer to a cautious water supply, and Level 2 indicates a state in which the intensity of the water supply is middle between the strong water supply and the weak water supply and may refer to a normal water supply. The water supply level, which is classified in accordance with the water supply amount by adjusting the water supply valve, may be determined in consideration of the type of water supply valve and a relationship with the water supply amount. The water supply levels are defined with reference to FIG. 3A according to the exemplary embodiment of the present disclosure. The water supply level is defined as the erroneous water supply (no water supply) when the water supply level is 0 degree, the cautious water supply (insufficient water supply) when the water supply level is Water Supply Half 1 (45 degrees), and Water Supply Half 2 (90 degrees), Water Supply Half 3 (135 degrees), and Water Supply Full (180 degrees, 225 degrees, and 270 degrees) may be defined as the normal water supply (Water supply Full).

Figure 4:
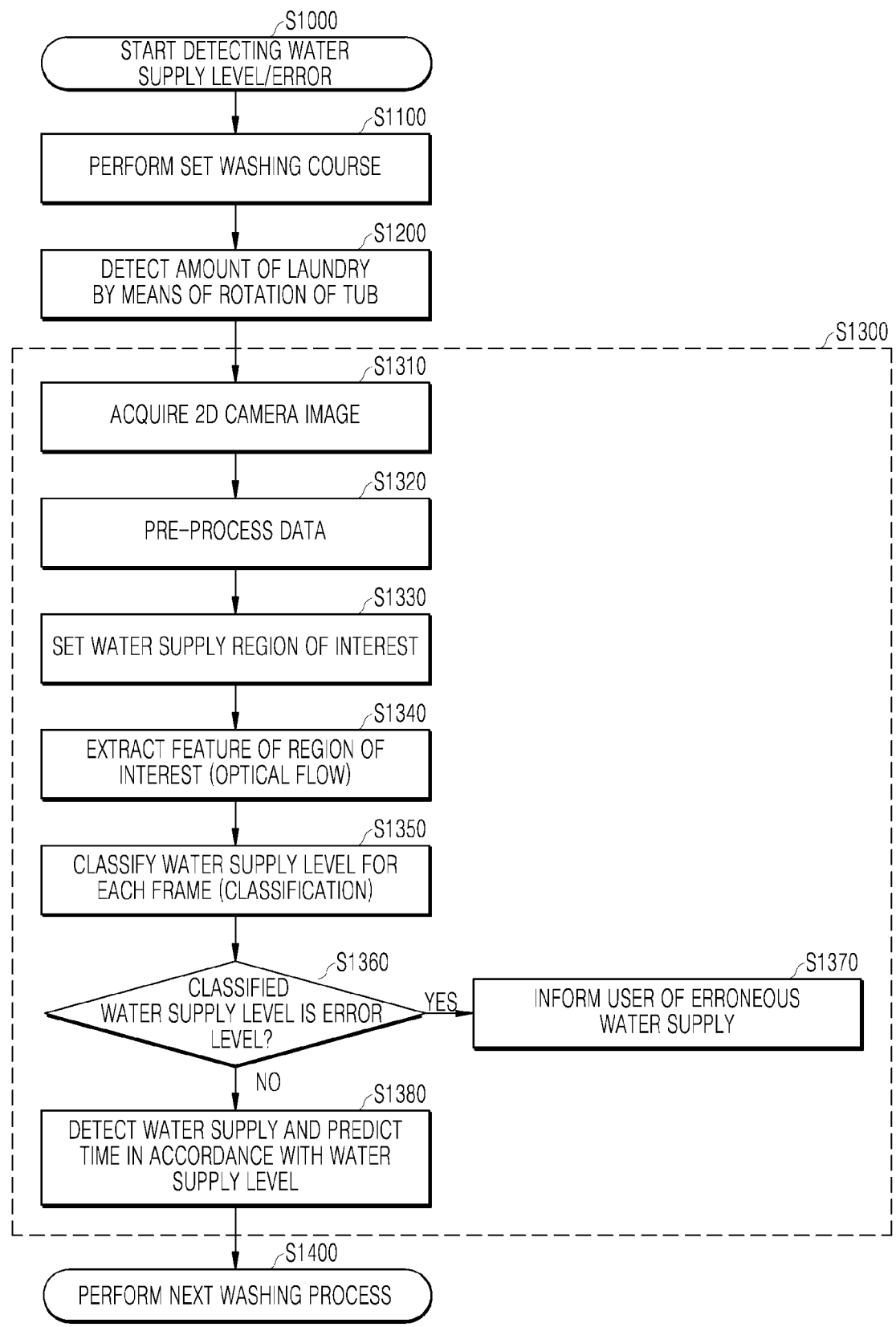
FIG. 4 is a flowchart illustrating a method of detecting a water supply level according to the exemplary embodiment of the present disclosure.

FIG. 4 is a flowchart illustrating a method of detecting a water supply level. An image of the washing water being supplied to the washing machine tub is captured/acquired by the vision sensor 140 and transmitted to the determiner. The determiner may process image information as water supply sensed/detected data (image data) and detect the water supply level through a vision algorithm based on the image information acquired by the vision sensor 140. The determiner may be the washing machine MCU or the controller including the washing machine MCU. To detect the water supply level, the determiner may set a water supply region of interest ROI in respect to the image data acquired from the vision sensor 140.

When the method of detecting the water supply level in the washing machine starts (S1000), a washing course set by a user is performed (S1100).

In step S1200, the washing machine tub 130 is rotated, and the amount of laundry in the tub 130 is detected (S1200). The rotation of the tub for detecting the amount of laundry may automatically start within several seconds after the course is selected. The determiner or the washing machine MCU may detect the amount of laundry by rotating the tub for a predetermined time such as 1 minute and 51 seconds or 2 minutes and 50 seconds, for example.

When the amount of laundry is detected, detecting the water supply level/error is performed in step S1300, and then a washing process is performed (S1400).

The detecting of the water supply level/error (S1300) is performed based on the following sequence.

In step S1310, an image is inputted by the 2D camera, which is the vision sensor 140, and the image acquired by the vision sensor 140 is transmitted to the determiner. The vision sensor or the determiner may process an analog signal into a digital signal.

In step S1320, the determiner pre-processes the acquired image to process the image into data suitable to detect the water supply level/error.

In step S13300, the determiner may set the water supply region of interest ROI in respect to the pre-processed image data. The water supply region of interest is set as a part in which the amount of supplied water may be monitored, and particularly, set as a part in which the water is supplied to the washing machine tub 130. In the case of the top loader washing machine, a part of the upper end of the washing machine tub 130, where the water is supplied, may be set as the water supply region of interest. At least one region of a part in which the water is supplied into the tub of the washing machine and a part which is filled with the washing water may be designated to the water supply region of interest.

In step S1340, the determiner detects a feature of the water supply region of interest through a predetermined vision algorithm. For example, a background subtraction algorithm may be used as the predetermined vision algorithm. Particularly, an optical flow algorithm may be used as the predetermined vision algorithm. For example, the optical flow algorithm may be the Lucas-Kanade algorithm, the pyramid Lucas-Kanade algorithm, or the Gunnar-Farneback algorithm. Particularly, the Lucas-Kanade algorithm may be used as the vision algorithm. A performance test in respect to methods of detecting a water supply level/error by applying the optical flow algorithm and the background subtraction algorithm will be described with reference to FIG. 5.

In step S1350, the determiner may classify the water supply level for each frame based on the feature of the region of interest. As illustrated in FIG. 3B, the optical flow algorithm may classify the water supply level into 4 levels, that is, Level 0, Level 1, Level 2, and Level 3, by using a magnitude of an optical vector for each frame, an average, a standard deviation, a maximum value, a mode, a frame-accumulated average value, and the like. In another exemplary embodiment, the water supply level may be classified into 3 levels, that is, Level 0, Level 1, and Level 2, by the optical flow algorithm. A specific classification method will be described with reference to FIGS. 7A to 7C.

When it is determined that the water supply level classified in step S1360 is an error level, the process goes to step S1370 and informs a user of an erroneous water supply. It may be determined that the water supply level is the erroneous water supply level when the water supply level is Level 0 which is no water supply. In another exemplary embodiment, Level 1, which is a cautious water supply level, may be determined as the error level. The determiner may inform the user of the erroneous water supply through the output device 400 such as the user terminal 300, a TV, or an artificial intelligence speaker. The determiner may inform the user of the erroneous water supply through the washing machine communicator by using Bluetooth, infrared data association (IrDA), ultra-wideband (UWB), ZigBee, wireless fidelity (Wi-Fi) technologies as the near-field communication.

When it is determined that the water supply level classified in step S1360 is not the error level, the water supply is detected in accordance with the water supply level in step S1380, and the water supply time required to supply water to the washing machine tub may be predicted based on the detected water supply level. For example, when it is determined that the water supply level is Level 2, the water supply amount may be calculated in seconds in a case in which the water is still supplied with the water supply amount of Level 2, and the remaining water supply time may be predicted by calculating how long it takes to supply the water to a tub capacity required to perform the washing process through a proportional expression with respect to an overall capacity of the washing machine tub. If the time taken to complete the water supply of 10 liters of cold water, with the water supply amount of Level 2, is 20 seconds, the water supply amount (water pressure) per 1 second is 0.5 liter. If the capacity of the washing machine tub to which the water needs to be supplied is 140 liters, it may be predicted, through the proportional expression, that the water supply is completed in 280 seconds because the time taken to supply 140 liters of water is "140 liters*2 seconds=280 seconds".

In another exemplary embodiment of the present disclosure, the server 200, which receives the water supply image data from the determiner or the washing machine including the determiner, may predict the remaining water supply time through machine learning. The determiner creates a learning data set using label values, which are the amount of water being supplied for each water supply level and the water supply time to a point in time at which the water supply is completed with the amount of water, and the determiner may predict the water supply time to the point in time at which the water supply is completed for each water supply level based on models trained by machine learning.

The washing machine controller and/or server 200 may create a training data set and/or a test data set required to apply the machine learning algorithm by using the label values which are the amount of water being supplied for each water supply level and the water supply time to the point in time at which the water supply is completed with the amount of water. Typically, the test data set is defined by dividing a part of the training data set. A ratio between the training data set and the test data set may vary depending on the amount of data and may be generally set to 7:3. Throughout the present disclosure, unless specifically mentioned, the term 'trained model' means that the training data set is trained and the trained model is determined after testing the test data set. The washing machine controller and/or server stores the training data set and/or the test data set in the storage and trains the stored training data set through the machine learning algorithm to predict the water supply time until the remaining water supply completion in accordance with the water supply level. The trained model may be tested through the test data set to determine the trained model, and after the trained model is determined, the water supply time to completion of the water supply may be predicted.

The controller may be included in an artificial neural network, for example a deep neural network (DNN) such as, for example, a CNN, an RNN, a DBN, and may learn the deep neural network. As the machine learning method of the artificial neural network, both unsupervised learning and supervised learning may be used. The controller may control and update the remaining water supply time artificial neural network structure in accordance with the water supply level after learning in accordance with the setting.

In another exemplary embodiment of the present disclosure, a regression analysis algorithm may be applied as the machine learning algorithm, such that to predict the water supply time in accordance with the water supply level by the washing machine controller or server, the feature of the water supply amount of the washing water supplied for each water supply level and the water supply time to the point in time at which the water supply is completed in accordance with the water supply level are used as the training data set and/or the test data set.

When learning (training) through the regression model with the training data set in respect to the feature of the water supply amount of the washing water supplied for each water supply level and the water supply time to the point in time at which the water supply is completed in accordance with the water supply level, it is possible to obtain the corresponding trained machine learning model. The regression model finds an optimum model, such as when the distribution of data may be represented within a line. Assuming that the model of the trained data is correct, finding and displaying the regression line may be considered as learning. As illustrated in FIG. 4, in step S1380, if the time taken to complete the water supply of 10 liters of cold water, with the water supply amount of Level 2, is 20 seconds, the water supply amount (water pressure) per 1 second is 0.5 liter. If the capacity of the washing machine tub to which the water needs to be supplied is 140 liters, it is calculated that the time taken to supply 140 liters of water is "140 liters*2 seconds=280 seconds", through the proportional expression between the water supply amount of the water supply level and the taken time. In this way, if the water supply level may be determined and the water supply time to the point in time at which the water supply is completed may be collected, the regression analysis model may be created between the image data value in accordance with the water supply level and the water supply time to the point in time at which the water supply is completed. Expressed as an equation, $H(x)=Wx+b$, where $H(x)$ is a hypothesized hypothesis function and a shape of a linear function graph varies depending on a value of W (weight) and a value of b (bias).

Therefore, in order to predict the water supply time in accordance with the water supply level, the determiner or the server of the washing machine may apply the regression analysis algorithm to the training data set and/or the test data set using the label values which are the amount of water being supplied for each water supply level and the water supply time to the point in time at which the water supply is completed with the amount of water, and the determiner or the server may transmit the trained model to the determiner of the washing machine. The determiner may predict the water supply time until the completion of the water supply through the trained regression model.

FIG. 5 is an exemplified view illustrating tests of water supply level detecting performances with respect to the Lucas-Kanade algorithm, the pyramid Lucas-Kanade algorithm, the Gunnar-Farneback algorithm, and the background subtraction algorithm which are vision algorithms; FIG. 5 illustrates a result of testing the Lucas-Kanade algorithm, the pyramid Lucas-Kanade algorithm, the Gunnar-Farneback algorithm, and the background subtraction algorithm to use the vision algorithm to detect a water supply level/error.

The Lucas-Kanade algorithm sets up each pixel window in one frame and finds the best match for this window in the next frame. Less computation is required because the optical flow is tracked by using feature points that stand out as sparse optical flows, such as corners. Because of the use of a small area of the window, the motion may not be calculated if the motion is larger than the window. The optical flow is obtained by using the feature points, which results in lower accuracy than a dense optical flow. The pyramid Lucas-Kanade algorithm is a method designed to improve the disadvantage of not calculating large motions in the Lucas-Kanade method and implements an image pyramid from an original image in accordance with an image scale. The Gunnar-Farneback algorithm is a type of dense optical flow that computes a motion between two adjacent frames on an extended polynomial basis.

The background subtraction algorithm calculates a moving difference between the previous pixel and the current pixel. The key to the background subtraction algorithm is that background modeling needs to sufficiently recognize a moving object. Examples of the most common method for performing background modeling include a mean filter and a median filter. A background extraction method uses a method that uses a difference between the current image and the background image for detecting a moving object. However, it is very sensitive to a change in the surrounding environment. However, if the information about the background is known, it is possible to obtain complete information about the object.

The Lucas-Kanade algorithm has the best performance as a result of comparing the water supply level detection performance using the four vision algorithms. In the present invention, the Lucas-Kanade algorithm may be used as a method of detecting the water supply level, but other optical flow methods may also be used.

FIG. 6A is an exemplified view illustrating the water supply region of interest (ROI) set in respect to image data acquired by a vision sensor. As illustrated in FIG. 6A, in the case of the top loader washing machine, preferably, a water supply region of interest 180 may be set at the upper end of the tub. Because the inside of the tub is silver and the water is transparent, it is sometimes difficult to determine whether the washing water is properly supplied into the tub from the image data acquired by the vision sensor. Therefore, the water supply region of interest 180 may be set at the upper end of the tub instead of the inside of the tub 130. In addition, at least one water supply region of interest may be set. If there are multiple parts in which the water is supplied into the tub, the multiple parts may be set as the water supply region of interest, for example water supply regions of interests 180 and 182. In addition, if the water is being supplied from various parts at the upper end of the tub, it is possible to set multiple water supply regions of interest.

In the case of the drum washing machine, the vision sensor may be mounted on the front door, and the upper surface of the inner surface of the cylindrical shape of the tub having a rotating shaft toward the front side, where the water is supplied, may be set as the water supply region of interest. Even in the case of the drum washing machine, multiple regions in which the wash water is supplied may be set as the water supply region of interest.

FIGS. 6B to 6E are exemplary views illustrating a state in which water supply detection image data designates the water supplier in the tub as the water supply region of interest based on data having 3 to 5 second images (30 frames per second) and uses the optical flow algorithm as the vision algorithm. Referring to FIGS. 6B to 6E, the optical flow is detected, and a magnitude of the optical vector has a minimum threshold value of 208 and is detected from 208 or more. The optical vector is represented by a set of dots at the part at the upper end region of the tub where the water is supplied, the optical vector means that the darker and wider the optical vector, the more washing water is supplied. In addition, when the water supply is stably performed, the optical vector has a wide distribution and the vector values are arranged in the region of interest.

Figure 6B:
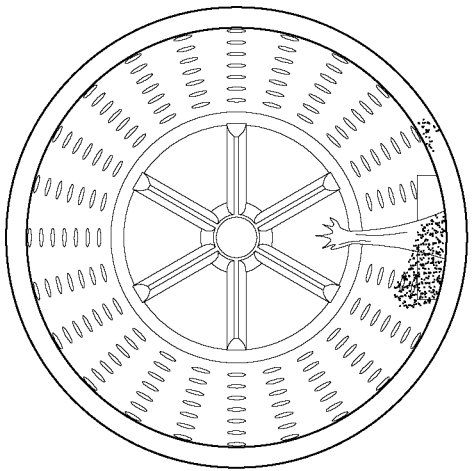
FIG. 6B is an exemplified view illustrating a state in which the water supply region of interest is set in accordance with FIG. 6A and an optical vector in a water supply detection start section is indicated by using an optical flow.

FIG. 6B is an exemplified view illustrating a state in which the water supply region of interest is set in accordance with FIG. 6A and an optical vector in a water supply detection start section is indicated by using an optical flow. FIG. 6B illustrates that the washing water weakly trickles in a water supply detection start section. A magnitude of the water supply detection optical vector is 268, and the optical vector (represented by a set of dots) is thick, but because the washing water flows weakly, the optical vector occupies a part of the region of interest, that is, about a half of the drawing.

Figure 6C:
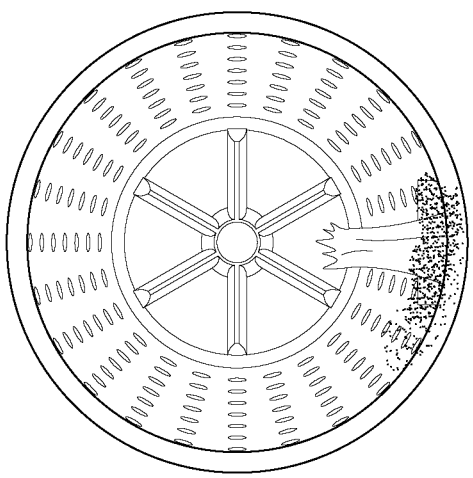
FIG. 6C is an exemplified view illustrating a state in which the water supply region of interest is set in accordance with FIG. 6A and an optical vector in a section in which a water supply is detected most often is indicated by using an optical flow.

FIG. 6C is an exemplified view illustrating a state in which the water supply region of interest is set in accordance with FIG. 6A and an optical vector in a section in which a water supply is detected most often is indicated by using an optical flow. FIG. 6C illustrates that the magnitude of the water supply detection vector value is 328, which indicates that the optical vector (a set of dots) is thick and evenly spread over the set region of interest. It can be seen that the optical vector is displayed the largest when the transition from the weak flow (trickling) section to the strong flow (lined) section.

FIG. 6D is an exemplified view illustrating an optical vector in a section in which the water supply region of interest is set in accordance with FIG. 6A and the full water supply starts using the optical flow. Referring to FIG. 6D, it can be ascertained that the magnitude of the water supply detection optical vector is 214 and smaller than that of FIG. 6B in which the wash water weakly flows, but the optical vector is widely spread over the region of interest. Because the magnitude of the optical vector is small even though the water is fully supplied to the region of interest, the optical vector is evenly and lightly distributed as the water supply is stably performed.

FIG. 6E is an exemplified view illustrating a state in which the water supply region of interest is set in accordance with the FIG. 6A and an optical vector in a section in which a water supply is stably performed in a normal water supply manner is indicated by using an optical flow; Referring to FIG. 6E, it can be ascertained that the magnitude of the water supply detection optical vector is 262 and smaller than that of FIG. 6B in which the wash water weakly flows, but the optical vector is widely spread over the region of interest. Because the magnitude of the optical vector is small even though the water is fully supplied to the region of interest, the optical vector is evenly and lightly distributed as the water supply is stably performed, and it can be ascertained that the optical vector is thicker than that of FIG. 6D. The average value of the optical vector in the full water supply section illustrated in FIGS. 6D and 6E entering the stable water supply section is 227.17. Therefore, in the exemplary embodiment of the present disclosure, the optical flow algorithm may determine the water supply level based on the distribution of the optical vector and the magnitude of the optical vector for the region of interest series.

FIG. 7A is an exemplified view illustrating frame averages, standard deviations, variances, sums, and maximum values with respect to water supply levels. The water supply levels are Level 0, Level 1-1, Level 1-2, and Level 2. The levels correspond to Level 0, Level 1, Level 2, and Level 3 illustrated in FIG. 3B, respectively.

It can be seen that an average curve 190 of the optical vector increases linearly from 20.17 at Level 0 to 130.29 at Level 1-1, and then the magnitude of the optical vector is 242.19 and 243.87 and thus almost constant in the water supply stability sections (Levels 1-2 and 2), respectively.

FIG. 7B is an exemplified view illustrating a graph showing a moving average of optical vectors up to 0, 2, 3, 4, 5, and 10 frames. Because there are 30 frames for 1 second, if the water supply level is detected for 3 to 5 seconds, 90 to 150 frames of data may be collected.

FIG. 7B illustrates the moving average of the optical vectors in which the number of frames is 1, 2, 3, 4, 5, and 10, respectively. The reason for obtaining the moving average is that, as illustrated in FIGS. 6B to 6E, even if the supplied washing water is weak (tickling), the magnitude of the optical vector may be higher than the average of 227.17 in the section in which the magnitude of the optical vector is 268 and the water is fully and strongly supplied (gushing). When the cumulative average in accordance with the number of frames is obtained, since the magnitude of the optical vector is gentle for each water supply level, a meaningful experimental value may be obtained to determine the water supply level.

As illustrated in FIG. 7B, the optical vector graph of one frame value has a large change in magnitude, but as the number of frames to be averaged increases, the change in the magnitude of the optical vector becomes gentle. Meanwhile, because there is no great difference in moving average graph between when the moving average is averaged by 5 frames and when the moving average is averaged by 10 frames, it is possible to obtain the level classification in which Level 0 (Empty), Level 1 (Half 1), Level 2 (Half 2), and Level 3 (Full) are distinguished by the moving average of up to five frames. According to the optical vector graph of FIG. 7B, the water supply level may be determined by moving average of five frames. In another exemplary embodiment, the water supply level may be determined by obtaining a moving average with a frame number larger or smaller than five.

To obtain the cumulative average averaged by the five frames, it is possible to obtain a total of 86 five-frame moving average from the 1st frame and the 2nd to 6th frames to the 86th to 90th frames. To obtain the five-frame moving averages in respect to the 1st to 90th frames, a total of 86 five-frame moving averages may be obtained. The water supply level may be determined by considering all of the 86 five-frame moving averages, and the moving average value of the five-frame moving average, which is the most frequently shown among the 86 five-frame moving averages, may be used as the moving average value for the determination of the water supply level. Specific data regarding the five-frame moving average will be described with reference to FIG. 7C.

Figure 7C:
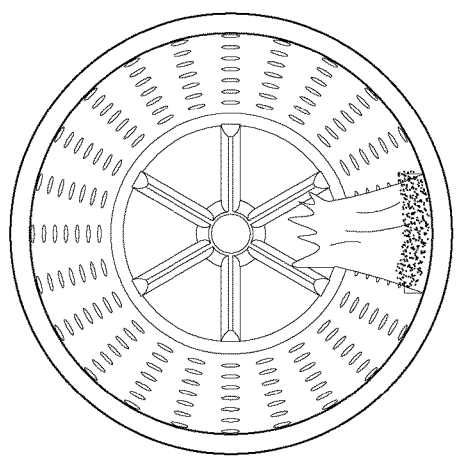
FIG. 7C is an exemplified view illustrating accumulated values of moving averages of optical vectors in respect to 5 frames.

FIG. 7C is an exemplified view illustrating accumulated values of moving averages of optical vectors in respect to 5 frames. FIG. 7C illustrates minimum values, maximum values, average values, intermediate values, and ranges of the magnitudes of the five-frame average optical vectors for Level 0 (no water supply), Level 1 (small water supply, cautious water supply), Level 2 (large water supply, quasi-normal water supply), and Level 3 (gushing water supply, normal water supply). The water supply level of FIG. 7C may correspond to Level 0, Level 1, Level 2, and Level 3 shown in the table in FIG. 3B.

In FIG. 7C, the optical vector range of Level 0 (no water supply) may be set from the minimum value of 124 to the maximum value of 524, the optical vector range of Level 1 (cautious water supply) may be set from the minimum value of 601 to the maximum value of 1,212, the optical vector range of Level 2 (quasi-normal water supply) may be set from the minimum value of 1,725 to the maximum value of 2,853, and the optical vector range of Level 3 (normal water supply) may be set from the minimum value of 1,777 to the maximum value of 3,046.

Therefore, in the exemplary embodiment of the present disclosure, if the five-frame moving average of the frame data of the optical vector collected for three seconds (90 frames) is 200, the water supply level is determined as Level 0 and regarded as the erroneous water supply, and it is possible to inform the user of the erroneous water supply. The optical flow algorithm may apply the frame moving average to determine the water supply level and determine the water supply level based on the average value of the vector values. In addition, if the five-frame moving average of the frame data of the optical vector collected for three seconds (90 frames) is 2,200, the water supply level may be determined as Level 2, and the expected water supply time may be predicted.

In the exemplary embodiment of the present disclosure, it is possible to predict the expected water supply time by collecting the frame moving averages accumulated to the point in time at which the water supply is completed for each water supply level and by performing machine learning. That is, the determiner may accumulate the frame moving averages from the point in time at which the water supply is performed to the point in time at which the water supply is completed in order to determine the water supply level, and the determiner may predict the expected water supply time by performing the machine learning and creating the trained model based on the training data set using the accumulated frame moving averages and the water supply time.

In another exemplary embodiment, the determiner may transmit data of the frame moving averages and the water supply time to the server through the communicator of the washing machine, the server may perform the machine learning, create the trained model, and transmit the trained model to the washing machine, and the determiner may predict the water supply time to the point in time at which the water supply is completed based on the received trained model.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of program code include both machine code, such as produced by a compiler, and higher level code that may be executed by the computer using an interpreter.

As used in the present application (especially in the appended claims), the terms 'a/an' and 'the' include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example", etc.) used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various alterations, substitutions, and modifications may be made within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. An apparatus for detecting a fluid supply level, the apparatus comprising:
    a fluid supply container configured to receive a fluid supplied therein;
    a vision sensor mounted in a vicinity of the fluid supply container or on the fluid supply container, the vision sensor being configured to acquire an image including a portion in which the fluid is supplied into the fluid supply container; and
    a fluid supply level determiner configured to determine the fluid supply level in accordance with an amount of the fluid being supplied into the fluid supply container through a predetermined vision algorithm based on image information acquired by the vision sensor,
    wherein, based on the amount of supplied fluid, the fluid supply level determiner is configured to:
        classify the fluid supply level into three classifications including a no fluid supply, a cautious fluid supply, and a normal fluid supply; or
        classify the fluid supply level into four classifications including a no fluid supply, a cautious fluid supply, a quasi-normal fluid supply, and a normal fluid supply, and
    wherein the fluid supply level determiner is configured to determine the fluid supply level as an erroneous fluid supply when a result of determining the fluid supply level is no fluid supply based on the amount of supplied fluid.

2. The apparatus of claim 1, wherein the fluid supply level determiner is configured to:
    set at least one fluid supply region of interest with respect to the image information;
    detect a feature of the at least one fluid supply region of interest through the predetermined vision algorithm; and
    determine the fluid supply level based on the detected feature of the fluid supply region of interest.

3. The apparatus of claim 1, wherein, based on the amount of fluid being supplied for each fluid supply level, the fluid supply level determiner is configured to predict a fluid supply time to a point in time at which the fluid supply will be completed.

4. The apparatus of claim 1, further comprising a lighting device configured to illuminate an inside of the fluid supply container.

5. The apparatus of claim 2, wherein the fluid supply level determiner is configured to set a portion of an upper end of the fluid supply container as the at least one fluid supply region of interest with respect to the image information.

6. The apparatus of claim 2, wherein the vision algorithm is an optical flow algorithm, and the feature is an optical vector.

7. The apparatus of claim 6, wherein the optical flow algorithm is an algorithm that determines the fluid supply level based on a distribution of the optical vectors and a magnitude of the optical vectors with respect to the fluid supply region of interest.

8. The apparatus of claim 3, wherein, based on label values which are the amount of fluid being supplied for each fluid supply level and the fluid supply time to a point in time at which the fluid supply will be completed for each fluid supply level, the fluid supply level determiner is configured to:
    create a training data set;
    perform machine learning; and
    predict, based on a trained model, the fluid supply time to the point in time at which the fluid supply will be completed for each fluid supply level.

9. The apparatus of claim 6, wherein the optical flow algorithm is configured to use an average value of vector values calculated by applying a frame moving average to determine the fluid supply level.

* * * * *